United States Patent [19]

Flint

[11] Patent Number: 4,932,573

[45] Date of Patent: Jun. 12, 1990

[54] SOFT COVER FOR SPARE TIRE

[75] Inventor: Ronald T. Flint, Irvine, Calif.

[73] Assignee: B/T Western Corporation, Newport Beach, Calif.

[21] Appl. No.: 333,340

[22] Filed: Apr. 4, 1989

[51] Int. Cl.⁵ .............................................. B62D 43/00
[52] U.S. Cl. ................... 224/42.12; 224/42.06; 224/42.2; 224/42.24; 296/37.3; 206/304.1
[58] Field of Search ............ 296/37.3; 206/304, 304.1, 206/304.2; 224/42.06, 42.12.42.13, 42.2, 42.24, 42.25, 42.45 R

[56] References Cited

U.S. PATENT DOCUMENTS

| | | | |
|---|---|---|---|
| 788,215 | 4/1905 | Mitchell | 206/304.1 |
| 1,153,305 | 9/1915 | Heath | 296/37.3 X |
| 1,244,417 | 10/1917 | Brosman | 296/37.3 X |
| 1,398,259 | 11/1921 | Dube | 206/304.1 |
| 1,461,021 | 7/1923 | Bate | 206/304.1 |
| 1,508,419 | 9/1924 | Sundback | 206/304.1 |
| 1,607,778 | 11/1926 | Noreau | 296/37.3 |
| 1,917,157 | 7/1933 | Ricci | 206/304 |
| 3,593,898 | 7/1971 | Diforte | 224/42.2 |
| 3,880,335 | 4/1975 | Winkler | 224/42.13 |
| 4,126,169 | 11/1978 | Magnuson et al. | 206/304.1 |

FOREIGN PATENT DOCUMENTS

| | | | |
|---|---|---|---|
| 1746 | of 1913 | United Kingdom | 206/304.1 |
| 1455 | of 1915 | United Kingdom | 206/304.1 |

Primary Examiner—Ernest G. Cusick
Attorney, Agent, or Firm—Poms, Smith, Lande & Rose

[57] ABSTRACT

The present invention shows a soft cover for a tire formed from a molded, hard, hat-shaped core which mounts between the tire mounting bracket and the tire. The hat-shaped core has a brim to which is attached a first soft, hat-shaped cover. A second soft, hat-shaped cover is permanently attached to the first soft hat-shaped cover over a portion of its periphery. The remaining portion of the periphery between the two soft, hat-shaped covers is closed by a zipper. The core maintains the orientation of the two soft covers and, in combination therewith, fully encloses the tire.

15 Claims, 1 Drawing Sheet

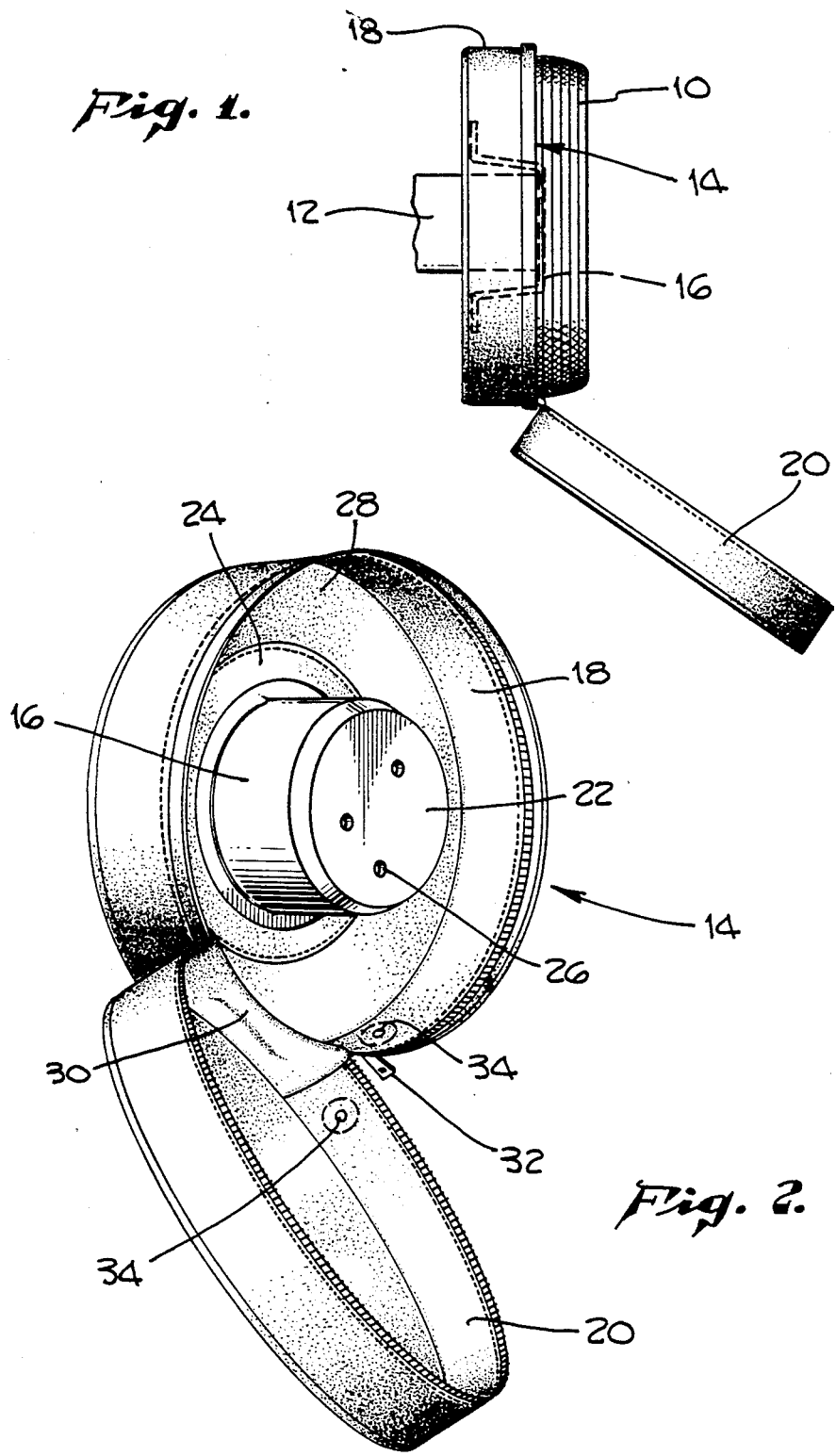

1

SOFT COVER FOR SPARE TIRE

BACKGROUND OF THE INVENTION

1. Field of the Invention

The present invention relates to a tire cover that is typically used on an externally mounted spare tire for an automobile or sport vehicle and, more particularly, to a cover that fully encloses a spare tire.

2. Description of the Prior Art

The external mounting of a spare tire on an automobile or truck is well-known in the art. Typically, a recreational vehicle such as a van, four-wheel drive vehicle, or small truck mounts its spare tire on a bracket. Over the years, various covers have been designed for the tires. One such design includes a metal cover fabricated from two hats joined together by suitable latches. Another, economical design is constructed as a canvas cover or skirt whose outer periphery is provided with an elastic band smaller than the outer diameter of the tire; in this way, the cover fits over and about the tire and is retained on it by the elastic band.

A major disadvantage of the economical cover is that no structural provision is made to ensure proper orientation of the cover on the spare tire. Improper orientation of the cover consequently leads to improper orientation of logos and designs, which are often placed on the cover. At worst, text or designs may appear upside down; at the least, extra care and effort must be taken when mounting the cover to ensure proper orientation. The likelihood that the cover may be inproperly oriented is, however, not merely an aesthetic shortcoming. Since drainage holes, if included, must be located near the lowest point of the cover when it is mounted on a tire, improper orientation may worsen or totally preclude drainage of the water which often accumulates in the cover. The need for drainage is made greater by the fact that these covers do not fully enclose or protect the tire. Of course, several drainage holes could be located around the entire periphery of the cover, but doing so would weaken the cover and complicate its manufacture.

SUMMARY OF THE INVENTION

Accordingly, it is an object of the present invention to provide an economical tire cover that will always be properly oriented upon the spare tire.

Another object of the present invention is to provide a tire cover that completely covers and seals the tire.

Yet another object of the present invention is to provide a tire cover which ensures adequate drainage with minimal manufacturing effort.

Still another object of the present invention is to provide a tire cover that may be secured so as to prevent theft or tampering.

In accomplishing these and other objects, there is provided a hat-shaped core which is mounted between the tire mounting bracket and the tire. This hat-shaped core has a brim to which a first soft, hat-shaped cover is attached. A second soft, hat-shaped cover is attached to the first at their mutual outer periphery by suitable fastening means. The hat-shaped core thus orients the first cover and, in turn, the second cover, which is attached to the first. The combination of the core and two covers fully encloses the tire.

DESCRIPTION OF THE DRAWINGS

Other objects and advantages of the present invention will become apparent after consideration of the following description and drawings, wherein:

FIG. 1 is a side elevational view showing the soft cover of the present invention mounted on a tire; and FIG. 2 is a perspective view showing the soft cover.

DESCRIPTION OF THE PREFERRED EMBODIMENT

Referring now to the drawings, FIG. 1 shows a spare tire 10 mounted on an autombile or truck tire mounting bracket 12 by suitable lug nuts, not shown. A soft cover 14 is mounted between the tire 10 and mounting bracket 12. The soft cover 14 is constructed from three basic elements: a core 16, a first soft cover 18, and a second soft cover 20.

As is best seen in FIG. 2, the core 16 is formed as a hard, hat-shaped member having a crown 22 and a brim 24. The mounting bracket 12 of a typical vehicle fits within the closed cylindrical rea formed by the crown 22 and is attached thereto by lug nuts, not shown, which pass through holes 26 in the crown 22. The hard, hat-shaped core may be constructed from a suitably molded plastic such as ABS plastic, and is preferably manufactured as a unitary member.

The first soft cover 18 is also formed hat-shaped, with its crown 28 having a large aperture. The inner diameter of the aperture is slightly smaller than the outer diameter of the brim 24. The soft, hat-shaped cover 18 may be formed of vinyl sheets of plastic which are sewn together in a well-known manner. The brim 24 of the core 16 is attached to the first soft cover 18 at its aperture by using any suitable fastening means or method, such as sewing. It will be seen that the outer circumferential periphery of the first cover 18 includes a 360-degree circumferential edge.

As seen in FIG. 2, the second cover is also hat-shaped, and includes a crown and a circumferential perimeter that matches the circumferential perimeter of the first soft cover. The second soft cover 20 is attached to the circumferential edge of the first cover over an edge portion which extends over slightly less than 90 degrees of the circumference. This attachment is created by a single vinyl sheet 30 which is sewn into the outer circumferential surface of both the first and second covers 18 and 20. Along the remainder of their circumferential perimeters, the two covers 18 and 20 are joined by suitable closure means, such as a zipper 32, snap fasteners, etc.

It will now be seen that the orientation of the core 16 on the mounting bracket 12 is determined by the placement of the holes 26 in the crown 22. Core 16, in turn, determines the orientation of the first soft cover 18, while the vinyl sheet 30 which joins the first soft cover 18 to the second soft cover 20 determines the orientation of the second soft cover. Drainage holes 34 may be provided in both the first and second soft covers. Since the orientation of the soft covers 18 and 20 is fixed by the hard core 16, the drainage holes 34 will automatically be located near the lowest point of the cover when it is mounted on the tire mounting bracket 12. Because of this automatic orientation, few drainage holes are needed, and one will normally be sufficient.

It will be seen that the combination of the core 16 and the first and second covers 18 and 20 fully encloses the tire 10. Further, if a lug nut, not shown, were replaced with a locking lug nut, also not shown, the soft cover 14 could be locked on the mounting bracket 12 to prevent theft.

The reder will understand that the configuration of the tire cover shown in the drawings is but one of several configurations. For example, the vinyl sheet 30 that joins the first and second soft covers 18 and 20 may be placed at any portion around the periphery of the covers to permit the second cover 20 to open to the side or above the tire 10 depending on the design of the vehicle on which the cover 14 is used. By fixing the orientation of the soft cover 14, it is possible to use a design or vehicle logo on the outer surface of the second cover 20 with assurance that it will always be oriented in the desired manner. Other variations of the present invention are also possible. This invention should be limited only by the appended claims.

I claim:

1. A soft cover for a spare tire that mounts upon a mounting bracket, comprising:
   a hard, hat-shaped core including means adapted for orienting said core on said bracket, a crown portion adapted for extending substantially into the central opening of said tire and providing support for said tire, and extending brim, and said core adapted for mount upon said mounting bracket;
   a first soft, hat-shaped cover formed to mount upon said extending brim and adapted to partially enclose said tire; and
   a second soft, hat-shaped cover formed to mount upon said first, soft, hat-shaped cover and constructed and arranged to fully enclose said tire, wherein said hard hat-shaped core orients said first and second soft covers about said tire for enclosing said tire.

2. The soft cover of claim 1, wherein:
   said hard, hat-shaped core having said brim is formed from a unitary piece of molded plastic 3. The soft cover ov claim 2, wherein:
   said first and second soft, hat-shaped covers are formed from sheets of vinyl plastic.

4. The soft cover of claim 3, wherein:
   said first and second soft, hat-shaped covers each have a substantially open circumferential perimeter, said perimeters are partially joined by a connecting piece of vinyl plastic and said covers include means for closure of said perimeters.

5. The soft cover of claim 4, wherein:
   said means for closure is a zipper.

6. The soft cover of claim 1, wherein:
   said first and second soft, hat-shaped covers are provided with drainage holes oriented at a lower portion of said cover by said hard, a hat-shaped core.

7. The soft cover of claim 1, wherein:
   said first soft, hat-shaped cover is mounted upon said brim of said hat-shaped core by sewing said soft cover to said brim.

8. A soft cover for a spare tire that mounts upon a mounting bracket, comprising:
   a hard, hat-shaped core, including means adapted for orienting said core on said bracket, a crown portion adapted for extending substantially into the central opening of said tire and providing support for said tire, an extending brim, and said care adapted for mounting upon said bracket;
   a first soft, hat-shaped cover having a crown with an aperture therein into which said extending brim is fitted and attached by means for attaching;
   a second soft, hat-shaped cover having an enclosed crown;
   said first and second soft, hat-shaped covers each having a circumferential perimeter attached along a portion thereof into a single connected unit and attachble along the remaining portion of the perimeter by means for closure;
   said har, hat-shaped core thus orienting said first and second soft, hat-shaped cover about said tire, and said first and second soft, hard-shaped covers fully enclosing said tire when attached along said perimeters.

9. A soft cover for a spare tire, said tire mounted on a vehicle by a mounting bracket comprising:
   a hat-shaped core including a crown, means in said crown adapted to mount and orient said crown upon said bracket, and said crown having an extension adapted to extend substantially into the central opening of said tire between said bracket and said tire;
   a first, hat-shaped cover formed to mount upon said extension of said core and adapted to partially enclose said tire; and
   a second, hat-shaped cover formed to mount upon said first hat-shaped cover and adapted to fully enclose said tire, wherein said crown orients said hat-shaped core which orients said first and second covers about said tire.

10. The soft cover of claim 9, wherein:
    said crown is adapted to be mounted between said tire and said mounting bracket.

11. The soft cover of claim 10, wherein:
    said crown is formed from a material harder than said first and second, hat-shaped covers; and
    said means in said crown adapted to mount and orient said crown are apertures therein.

12. The soft cover of claim 9, wherein:
    said core is formed from a hard material; and
    said first second covers are formed from a soft material.

13. The soft cover of claim 12, wherein:
    said core is formed from a hard, molded plastic material; and
    said first and second covers are formed from a soft, vinyl plastic sheet material.

14. The soft cover of claim 9, wherein:
    said first and second covers each have a substantially open circumferential perimeter;
    connecting means for partially joining said perimeters; and
    closure means for closing the remaining perimeters.

15. The soft cover of claim 9, wherein said hat-shaped cover further comprises:
    a brim extending from said extension of said crown; and
    said first hat-shaped cover mounted upon said brim.

* * * * *